US006416033B1

(12) United States Patent
McKell et al.

(10) Patent No.: US 6,416,033 B1

(45) Date of Patent: Jul. 9, 2002

(54) AIR OVER HYDRAULICS ACTUATOR SYSTEM

(75) Inventors: Samuel Holley McKell, Upper Beaconsfield (AU); Craig Grant Haroldsen, Orem, UT (US); Laren James Winkel, Orem, UT (US); Robert Edmund Gooch, Orem, UT (US)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 09/886,676

(22) Filed: Jun. 21, 2001

Related U.S. Application Data

(60) Provisional application No. 60/212,962, filed on Jun. 21, 2000.

(51) Int. Cl.[7] .................................... F16K 31/12

(52) U.S. Cl. ........................... 251/29; 91/4 R; 91/368; 91/388

(58) Field of Search ..................... 251/28, 29, 129.04; 91/4 R, 368, 388, 454; 60/413

(56) References Cited

U.S. PATENT DOCUMENTS

| | | | |
|---|---|---|---|
| 4,065,094 | A | 12/1977 | Adams |
| 4,215,844 | A | 8/1980 | Bowen |
| 4,335,867 | A | 6/1982 | Bihlmaier |
| 4,437,309 | A | 3/1984 | Suzuki et al. |
| 4,579,209 | A | 4/1986 | Pacht |
| 4,647,004 | A | 3/1987 | Bihlmaier |
| RE32,588 | E | 2/1988 | Bowen |
| 4,765,225 | A | 8/1988 | Birchard |
| 5,058,385 | A | 10/1991 | Everett Jr. |
| 5,161,449 | A | 11/1992 | Everett Jr. |
| 5,253,619 | A | 10/1993 | Richeson et al. |

*Primary Examiner*—William C. Doerrler
*Assistant Examiner*—Patrick Buechner
(74) *Attorney, Agent, or Firm*—Killworth, Gottman, Hagan & Schaeff LLP

(57) ABSTRACT

A valve actuation system with cooperating pneumatic and hydraulic control features. Compressed pneumatic fluid is generated in a pneumatic fluid supply, and flows in response to requirements between a predetermined command signal and an existing position of a working fluid valve. Hydraulic fluid is pressurized by a pump, and stored within the system by an accumulator. A servo valve comprising a pneumatic fluid flow path and a hydraulic fluid flow path is included to facilitate the flow of hydraulic fluid through the servo valve hydraulic fluid path and a downstream actuator for the working fluid valve in proportion to changes in pneumatic fluid flow through the servo valve pneumatic fluid flow path. A saturated fluid feedback circuit is included to shut off the flow of pneumatic and hydraulic fluid during select periods, such periods typically coincident with static conditions within the actuator of the working fluid valve, thereby reducing pump duty cycle.

19 Claims, 4 Drawing Sheets

AIR OVER HYDRAULICS ACTUATOR SYSTEM

This application claims the benefit of U.S. Provisional Application No. 60/212,962 filed Jun. 21, 2000.

BACKGROUND OF THE INVENTION

The present invention relates to a system for the actuation and positioning of a valve, and more particularly to a system that incorporates pneumatic and hydraulic features such that the pneumatic and hydraulic sections combine to control movement of a valve actuator, while the hydraulic section controls the power in a feedback-based control system. This "air over hydraulics" (alternately referred to as pneumatic-hydraulic) actuator system enhances valve performance by providing a high function and low maintenance actuator that has significant application in explosion- and fire-susceptible control valve market segments, such as the liquid natural gas (LNG) production market.

The use of pneumatically and hydraulically controlled valves in process and fluid-handling operations is well known. In many large-scale applications, an electro-hydraulic valve actuation system is employed, where a centralized power unit is typically spaced apart from one or more valves through a network of high-pressure hydraulic lines. Based on actuator stem position in relation to a particular process need, a differential transformer provides a feedback signal to direct the opening and closing of one or more of the valves. The presence of a device based on electronic circuitry, while benign in many applications, can be disastrous when placed around inflammable process fluids, as a spurious electrical signal can be enough to ignite the fluid or fluid vapors. All-pneumatic systems can alleviate the concerns over electric sources placed in proximity to flammable fluids; however, these systems are often deficient in that they cannot provide quick response times and high load capacity. In addition, the compressible nature of the fluid (typically air) in a system built predominantly on pneumatics can lead to instability problems. All-hydraulic systems, while capable of providing rapid, stable response, also suffer from various limitations, including system complexity, as well as leakage, maintenance and safety features associated with high pressure fluid lines.

In a typical pneumatic-hydraulic actuation system, there are two discrete circuit portions: a low pressure pneumatic circuit, and a high pressure hydraulic circuit. The pneumatic portion provides power to pumps and valves used to transport hydraulic fluid in the hydraulic portion, which sends hydraulic fluid to an actuator to reposition a working fluid control valve. Unfortunately, traditional pneumatic-hydraulic systems either employ single or limited discrete operational modes, thereby limiting their valve responsiveness and consequent system accuracy. In addition, valves in traditional pneumatic-hydraulic systems often rely on additional electronic circuitry or components to effect valve actuation. The presence of such electronic componentry and the signals they carry can, in a flammable environment, act as an ignition source. Furthermore, maintaining fluid pressures in an energized, high pressure state is not cost effective, as the pump cycles frequently or continuously to overcome system pressure losses due to leakage, thereby increasing operating expense. By way of example, compressor recycle valves used in LNG systems require, in addition to explosion proof operation, more continuous (and hence responsive) flow of fluid through the working fluid control valve. In such applications, the use of traditional pneumatic-hydraulic systems can result in substandard performance.

Accordingly, there exists a need for a valve actuation system that can offer the simplicity and safety of pneumatic-based systems and the responsiveness and load capacity of hydraulic-based systems, in combination with safety and operability-enhancing features to enable efficient, reliable and inexpensive valve actuation, especially in safety-critical applications.

SUMMARY OF THE INVENTION

This need is met by the present invention wherein a hybrid valve actuation apparatus combining the best features of pneumatic- and hydraulic-based systems is utilized. According to one aspect of the present invention, a valve actuation system is disclosed. This valve actuation system includes a valve stem position indicator coupled to a pneumatic positioner, a high pressure circuit for circulating hydraulic fluid, a low pressure circuit for circulating pneumatic fluid, and a saturated fluid feedback circuit. Components within the high pressure circuit include a hydraulic fluid reservoir, a pump, an accumulator to store pressurized hydraulic fluid being discharged from the pump, a hydraulic actuator to manipulate the position of a valve in a main fluid transport system (also referred to as a working fluid valve), a servo valve with both pneumatic and hydraulic fluid paths such that the flow of hydraulic fluid through the hydraulic fluid path is proportional to the flow of pneumatic fluid through the pneumatic fluid path, and a trip manifold to facilitate retraction of the actuator upon attainment of a preset condition. Components within the low pressure circuit include a pneumatic fluid supply, a pneumatic positioner to respond to changes in valve actuator position received from the valve stem position indicator and an external command signal, and a solenoid operated valve to selectively permit pneumatic fluid to flow to the trip manifold. The saturated fluid feedback circuit includes a shutdown manifold and a binary valve. The binary valve can intermittently cut off hydraulic fluid flow to the servo valve upon attainment of a preset saturation condition. Optionally, the trip manifold further comprises an interconnected valve arrangement alternately comprising a first configuration such that normal servo valve operation is enabled, and a second configuration wherein the interconnected valve arrangement is such that the trip manifold disables the servo valve. This second configuration is mutually exclusive to that of the first configuration in that any flow control valves internal to the trip manifold that are open to permit flow in the first configuration are likewise closed to cut off flow in the second configuration, as any internal flow control valves closed during the first are opened during the second. In addition, the trip manifold is in fluid communication with the accumulator, hydraulic actuator, shutdown manifold and solenoid operated valve, as well as with the reservoir and binary valve.

The use of the servo valve, with its proportional response, provides more controllable articulation of a working fluid valve than is achievable with stepwise actuator positioning. A further advantage of using a servo valve according to the present invention as compared to a traditional electro-hydraulic actuation system is that the only energy source for actuator operation comes from readily available pneumatic fluid supply, preferably in the form of instrument air supply which, due to its lack of electronic componentry, is inherently safe in flammable environments. In addition, the incorporation of a saturated fluid feedback circuit is important in that an intrinsic part of the operation of any pump is its duty cycle, or duty factor, which is generally expressed as a ratio between the time a device is operating and the total time for an intermittently operating device. Thus, a duty cycle of one means the pump is operating continuously. Since the pump is a significant power draw, and that by continual operation its parts are wearing out quicker, it stands to reason that lowering its duty cycle without concomitant reduction in system operation would be beneficial from both a cost and component life perspective.

According to another embodiment of the invention, a fluid handling system with at least one working fluid valve being manipulated with an air over hydraulic actuation device is disclosed. In addition to the valve actuation component configuration of the previous embodiment, the fluid handling system comprises a network of piping configured to transport a fluid with at least one working fluid valve to regulate the flow of the fluid through at least a portion of the piping. The air over hydraulic approach of the present embodiment is particularly useful in fluid handling systems that transport inflammable materials, such as LNG. In one application of the present embodiment, for example, the working fluid valve being manipulated could be a compressor recycle valve where high thrust, fast speed and low maintenance in an explosion-proof environment are required.

According to another embodiment of the invention, a method of using a valve with an air over hydraulic actuation device is disclosed. This method utilizes the valve actuation structure discussed in the previous embodiments, and includes arranging a working fluid valve coupled to an actuator and a valve stem to be disposed within a fluid handling system, arranging a valve actuation system to use both hydraulic and pneumatic fluids to control a working fluid flowing through the working fluid valve, sensing a valve stem position with a valve stem position indicator, relaying the sensed valve stem position to the pneumatic positioner through a common linkage between the valve stem position indicator and the pneumatic positioner, generating a difference signal by comparing the sensed valve stem position to a command signal, sending the difference signal to the servo valve to vary the flow of pneumatic fluid through the pneumatic fluid flow path in proportion to the magnitude of the difference signal, adjusting a flow of hydraulic fluid through the hydraulic fluid flow path in proportion to flow changes through the pneumatic fluid flow path, moving the actuator in response to changes in pressure caused by flow of the hydraulic fluid flowing through the hydraulic fluid flow path, positioning the trip manifold to facilitate retraction of the actuator upon attainment of a preset condition, and operating a saturated fluid feedback circuit to intermittently stop the pump, thereby effecting a reduction in the duty cycle. By this method, proportional working fluid valve actuation is effected. In addition, the automated intermittent shutting down of the pump has the effect of reducing both operating costs (via shorter periods of electricity consumption to operate the pump) and maintenance costs (due to lesser wear and tear on the pump).

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

The present air over hydraulic actuation system embodies two major functions. The first, actuation control, pertains to the operation of the system that leads to manipulation of the main working fluid control valve. The second, servo valve shutdown, pertains to efficiency-enhancing measures.

Actuation Control

Figure 1:
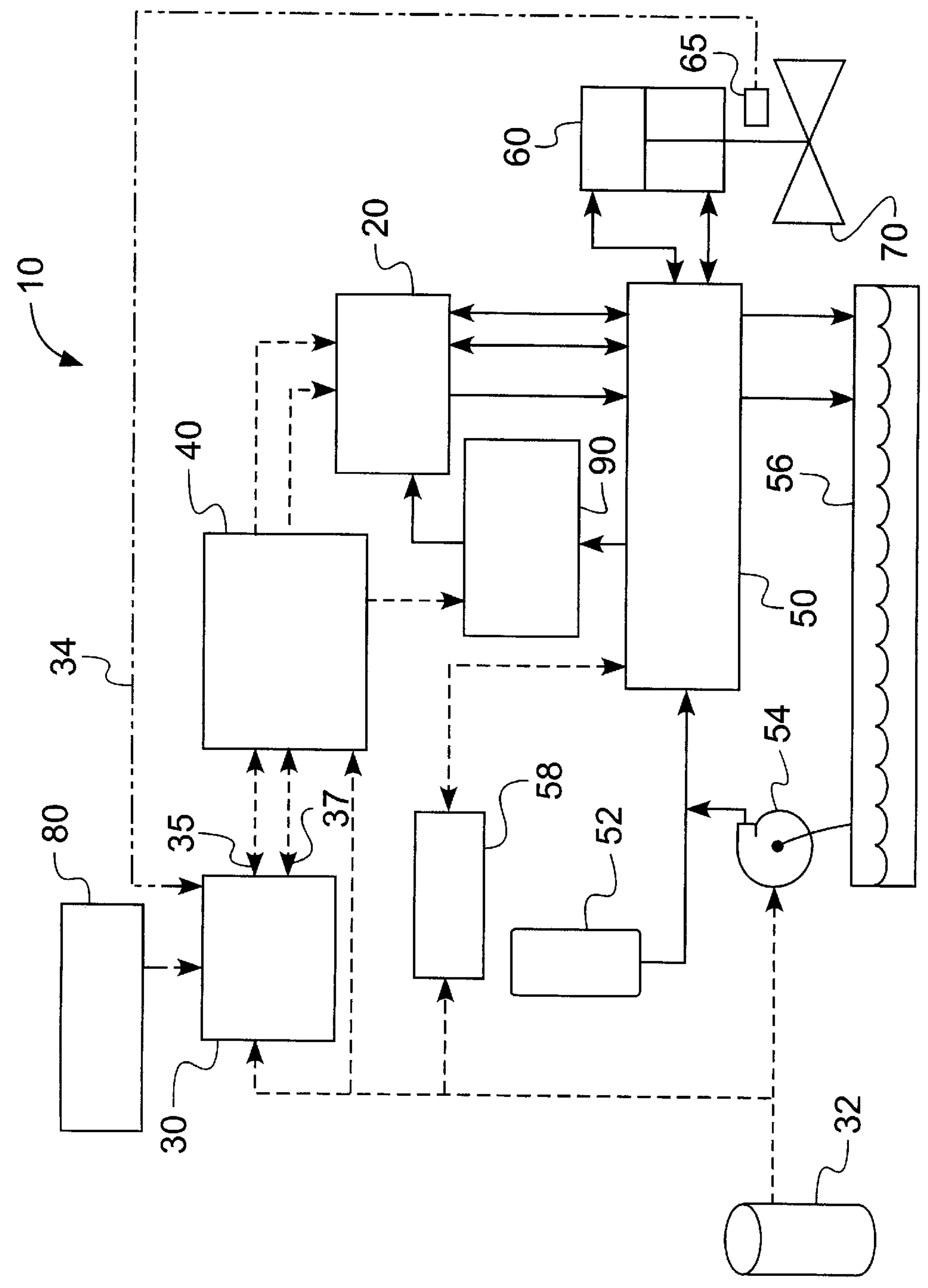
FIG. 1 is a schematic of the air over hydraulics actuator system block according to the present invention.

Referring now to FIG. 1, the main components of the air over hydraulics actuator system 10 include: a pneumatic over hydraulic servo valve 20 (hereinafter servo valve 20), a pneumatic positioner 30, a pneumatic fluid supply 32, a shutdown manifold 40, a trip manifold 50, an accumulator 52, pump 54, hydraulic fluid reservoir 56, solenoid operated valve 58, and a piston-style hydraulic actuator 60. The present system 10 is air over hydraulic in that, rather than having one fluid directly control the opening and closing of a working fluid valve 70, two separate fluid circuits are employed; a first, pneumatic fluid circuit is used to control the flow of hydraulic fluid in a second, hydraulic fluid circuit, which in turn controls the flow of the working fluid by manipulating the working fluid valve 70. The hydraulic actuator 60 is coupled to working fluid valve 70 to modulate the valve in response to flow requirements of the fluid disposed within the piping to which the valve is attached. In the present context, a "working fluid valve" is any valve placed within the flow path of a fluid handling system to which the apparatus of the present invention is coupled to effect changes in fluid flow therethrough. For example, a conventional valve in a network of pipes designed to transport a liquid or gas that has its opening and closing functions controlled by the hereindescribed invention would constitute a working fluid valve.

In a traditional all-pneumatic valve actuator, the output from the positioner would be used as a power source to operate a cylinder/piston or spring-diaphragm valve actuator. In the air over hydraulics actuator, on the other hand, the output from the pneumatic positioner 30 is the control input to the servo valve 20, which in turn allows varying amounts of hydraulic fluid through to control the hydraulic actuator 60. The controlwise communication between the pneumatic and hydraulic fluid circuits takes place in servo valve 20, which permits the flow of hydraulic fluid to hydraulic actuator 60, which is double acting, by way of trip manifold 50. By "double acting", it is meant that the actuation extends from the piston in both directions along the piston's translational axis such that by pushing the piston in one direction, it forces the valve to open, while pushing in the opposite direction forces the valve to close. The nature of a servo valve is that rather than operating as a binary "on/off" device, the amount of flow it permits to pass through its second circuit (in this case, hydraulic fluid) is in direct relation to the amount of fluid it receives from its first circuit (in this case, pneumatic fluid). Servo valve 20 receives its controlling input from the double acting pneumatic valve positioner 30 by way of shutdown manifold 40. The pneumatic valve positioner 30 is connected to a pneumatic fluid supply 32, which produces pressurized fluid (preferably air). Pneumatic valve positioner 30 controls the pneumatic fluid circuit in response to changes in valve position that it receives by virtue of its mechanical linkage (alternately referred to as a coupling) 34 with valve stem position indicator 65 located on the hydraulic actuator 60. The function of the pneumatic positioner 30 is to modulate the flow of pneumatic fluid to produce output flow that is in proportion to the difference between the sensed valve position information coming from coupling 34 and a predetermined command signal 80.

The hydraulic system is driven by an air powered fixed displacement pump 54. The pump 54 provides hydraulic fluid to the accumulator 52 through a hydraulic feedline connected to a reservoir 56. The pressurized hydraulic fluid from both the pump 54 and the accumulator 52 passes through trip manifold 50 and servo valve 20 to the hydraulic cylinder and piston assembly of hydraulic actuator 60. The accumulator 52 has three functions: the first is to store hydraulic power (in the form of pressurized fluid) that is produced by the hydraulic pump 54 so that the pump 54 is not required to operate continuously; the second is to act as a failsafe power supply to the hydraulic system in the event of pump 54 failure such that it can provide adequate hydraulic fluid pressure to the hydraulic actuator 60; and third, the accumulator 52 supplies hydraulic fluid to the hydraulic actuator 60 when pressure to the trip manifold 50 is blocked by the solenoid operated valve 58, thereby effecting rapid retraction of the working fluid valve 70.

Figure 2:
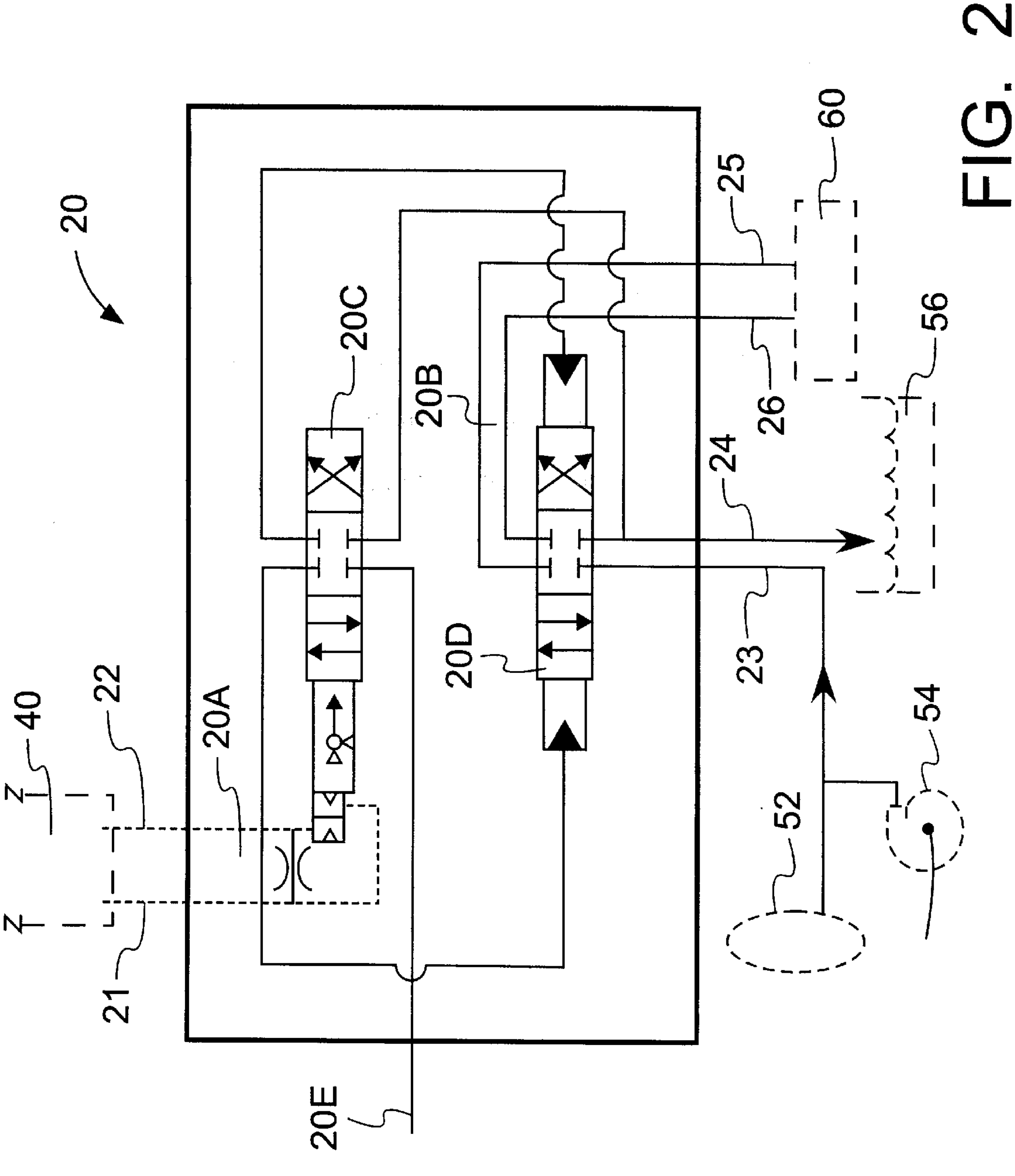
FIG. 2 is a schematic of a servo valve according to the present invention.

Referring now to FIG. 2, the servo valve 20 includes pneumatic fluid path 20A and hydraulic fluid path 20B, each in respective fluid communication with the pneumatic and hydraulic fluid circuits. Servo valve 20 receives pneumatic fluid into pneumatic fluid path 20A such that it can control individual four way valves 20C and 20D interconnected via fifth port 20E, thus establishing controlwise communication with hydraulic fluid flowing through hydraulic fluid path 20B. Pneumatic fluid path 20A includes first and second pneumatic ports 21, 22 that permit fluid exchange with pneumatic valve positioner 30 output (not presently shown) by way of shutdown manifold 40. Hydraulic power from the pump 54 or accumulator 52 is introduced into hydraulic fluid path 20B through first hydraulic port 23, and returned to reservoir 56 through second hydraulic port 24. Third and fourth hydraulic ports 25 and 26 connect hydraulic fluid path 20B to the double acting hydraulic actuator 60. By virtue of the controlwise communication between the pneumatic and hydraulic circuits, servo valve 20 permits the passage of hydraulic fluid in proportion to the flow of pneumatic fluid from the pneumatic positioner 30, resulting in a response in hydraulic actuator 60 that is more akin to a continuous, analog system than to a stepped, digital one. A stepped, digital response of actuation results in corresponding stepped changes of flow of the working fluid through the working fluid control valve 70, whereas a proportional response of actuation results in a smooth transition when a change of flow of the working fluid through the working fluid control valve 70 is required. The smooth transition of the proportional response allows more precise control of the working fluid flow, which equates to higher quality and higher efficiency of operation of the process. There are no conductive signal or pulse carriers or conductors to relay solenoid positioning information within the servo valve 20 or any part of the hydraulic fluid circuit, thus precluding the chance for an electric signal-generated spark. Accordingly, this control set-up is inherently explosion proof because it eliminates the need for electronic feedback of actuator stem position that is traditionally accomplished with a differential transformer. The servo valve 20 also allows simple actuator calibration and gain adjustment through widely understood pneumatic positioner 30 rather than a more complicated and unfamiliar electro-hydraulic valve.

Figure 3:
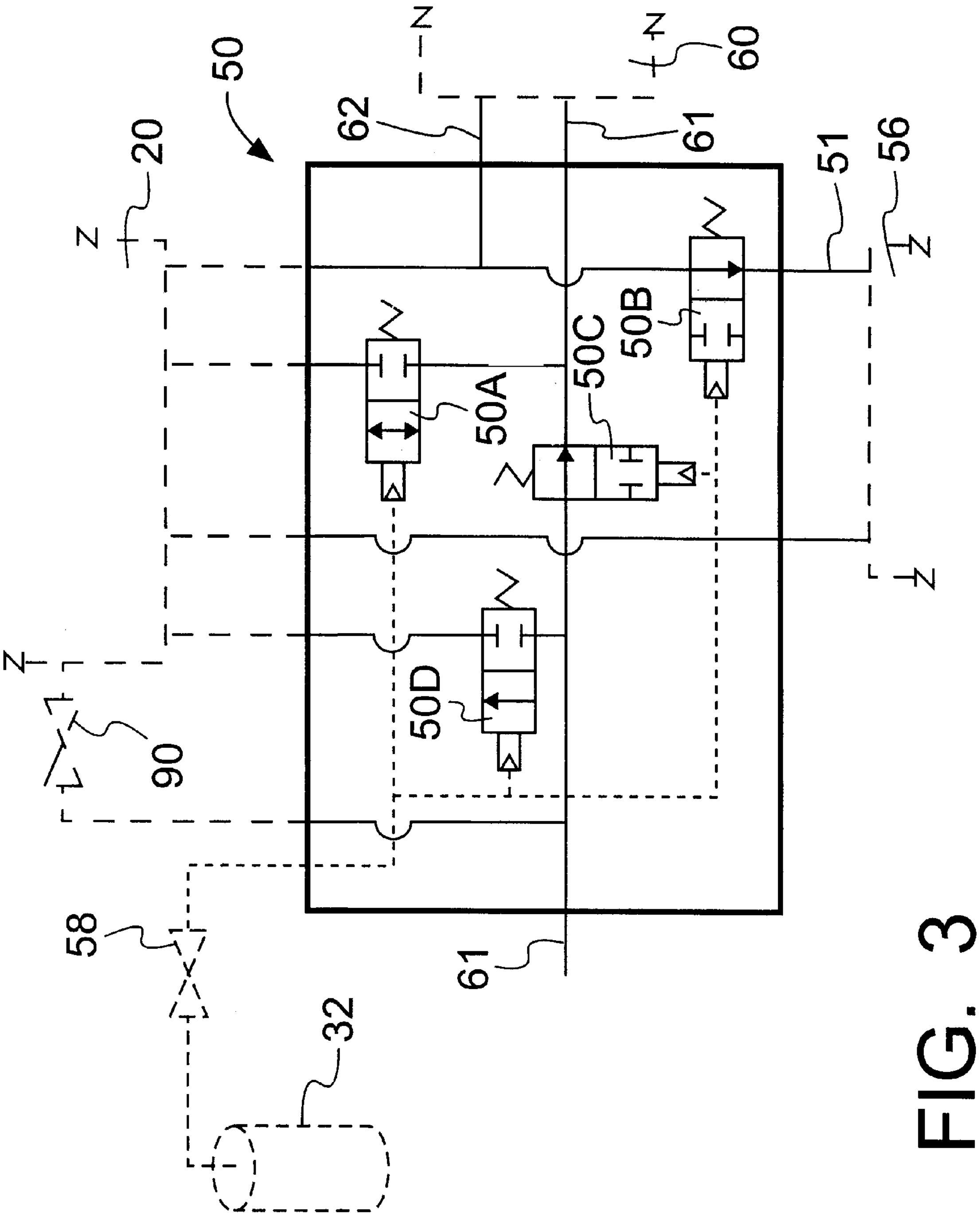
FIG. 3 is a schematic of a trip manifold according to the present invention.

Referring now to FIG. 3, the trip manifold 50 is used to bypass and override the entire servo valve system 20 during certain modes of operation. The trip manifold 50 incorporates a number of hydraulic valves 50A, 50B, 50C and 50D into its single manifold. During normal operation, the trip manifold 50 is "transparent" to the flow of actuator control fluid, allowing the servo valve 20 to control the position of the hydraulic actuator 60. In this condition (not shown), pressurized pneumatic fluid from pneumatic fluid supply 32 passes through solenoid operated valve 58 and operates to keep valves 50A and SOD open and valves 50B and 50C closed. The solenoid operated valve 58 receives pneumatic power from the pneumatic fluid supply 32 and receives electrical power from a valve controller (not shown). The state of the electrical power (with appropriate electrical rating for the particular locale of the solenoid valve 58) to the solenoid operated valve 58 determines whether or not it passes pneumatic pressure to the trip manifold 50. However, when the pneumatic fluid supply 32 is cut off, such as when an unacceptable flow of the working fluid through the working fluid control valve occurs, solenoid operated valve 58 blocks the flow of pneumatic fluid to the trip manifold 50, causing the device to become "tripped", which in turn causes the valves contained within trip manifold 50 to retract, thereby re-directing the flow of hydraulic fluid. In this tripped condition, valves 50B and 50C are open in conjunction with the closing of valves 50A and 50D to shunt the flow of hydraulic fluid directly to first port 61 of the hydraulic actuator 60. The second port 62 of the hydraulic actuator 60 is connected directly to the hydraulic reservoir 56 through now open valve 50B and trip manifold second port 51. This positioning causes the hydraulic actuator 60 to rapidly move to the fully retracted position.

Servo Valve Shutdown

Figure 4:
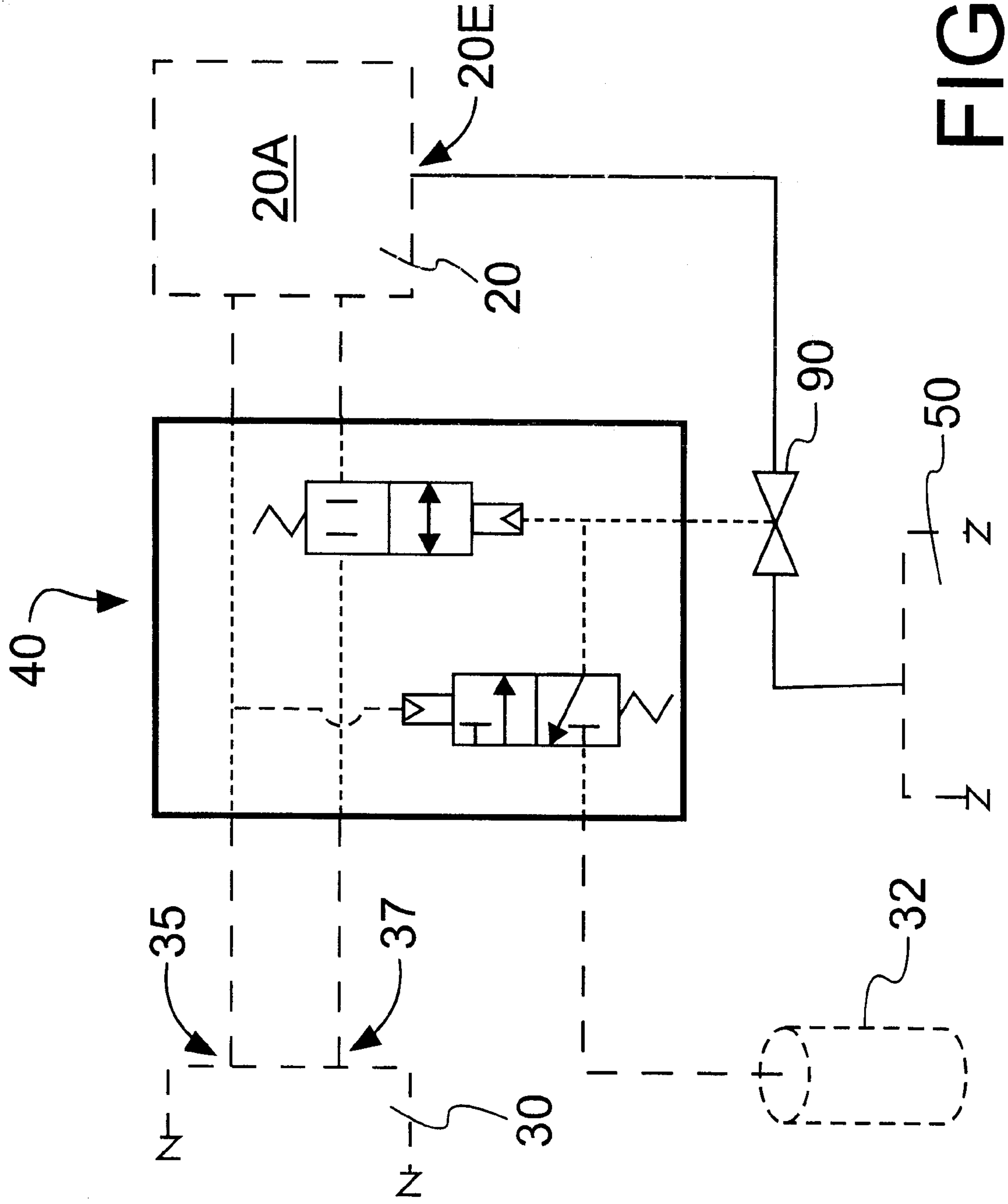
FIG. 4 is a schematic of a shutdown manifold according to the present invention.

The second feature, the servo valve shutdown feature, substantially reduces the overall energy requirement of the control system by automatically reducing the demand for pneumatic and hydraulic energy when the hydraulic actuator 60 is at the end of its stroke, such as when working fluid valve 70 is closed. Referring now to FIG. 4 in conjunction with FIG. 1, the servo valve shutdown feature has two main components: shutdown manifold 40 and binary valve 90. The shutdown manifold 40 recognizes when no motion of the hydraulic actuator 60 is required, by sensing when the pneumatic positioner 30 output is saturated. Under this condition, which could occur when the hydraulic actuator 60 reaches a static position with the working fluid valve 70 closed, the shutdown manifold 40 shuts off the consumption of compressed pneumatic fluid in the pneumatic positioner 30 and pressurized hydraulic fluid in the servo valve 20. By preventing the inherent consumption of these pressurized fluids that occurs during normal operation, the shutdown manifold 40 is capable of precluding both hydraulic and pneumatic power loss. This feature reduces energy costs and reduces the amount of time that the hydraulic pump 54 must operate. In addition, the automated operation ensures that human intervention in the process is not required, further reducing overall operating costs. The binary valve 90 is a true "on/off" device with no intermediate position. Thus, unlike the proportional response of many types of fluid valves, such as the previously-discussed servo valve, binary valve 90 acts purely as a switch.

When the working fluid valve 70 is closed, the pneumatic positioner 30 directs full system pressure out of its first output port 37 while allowing second output port 35 to approach atmospheric pressure. After second output port 35 reaches atmospheric pressure, binary valve 90 closes the servo valve 20 fifth port 20E that regulates quiescent flow. The purpose of binary valve 90 is to stop the flow of hydraulic fluid to the fifth port 20E of the servo valve 20 at the time the shutdown manifold 40 senses that the hydraulic actuator 60 is at the end of stroke or idle. If the flow to the fifth port 20E were not stopped, there would be a continual cycling of hydraulic fluid through servo valve 20 back to the reservoir 56, which would in turn require pump 54 to continue to operate. By stopping the fifth port 20E, the total power consumption (in the form of compressed pneumatic fluid) is reduced during the time the hydraulic actuator 60 is idle, as the lower demand on the accumulator 52 and pump 54 avoids the necessity of re-generating hydraulic pressure nearly as often. Simultaneous to the fifth port 20E being shutdown, another valve in the shutdown manifold 40 shuts-off the pneumatic flow through the pneumatic fluid path 20A of servo valve 20. Closing the second valve further reduces the demand for pneumatic energy when the main control valve 70 is closed. When the main control valve 70 starts to re-open, the pneumatic positioner 30 second output port 35 once again regains pressure allowing the servo valve 20 to regain control of the hydraulic actuator 60 by restoring pneumatic flow path 20A and hydraulic flow to fifth port 20E via binary valve 90.

Although individual components of the air over hydraulics actuator system 10 are currently commercially available, the unique combination and application of these components in a working fluid valve powered by a readily available pneumatic fluid (such as instrument air supply) creates an actuation system that is inherently explosion-proof and simple to calibrate and maintain. By combining the ease, simplicity, and safety of pneumatics with the high thrust and high performance of hydraulics, the air over hydraulics actuator system 10 contains thrust and control characteristics approaching those of electro-hydraulic actuation systems while eliminating complexity, extra maintenance, and safety issues.

Having described the invention in detail it will be apparent that modifications and variations are possible without departing from the scope of the invention defined in the appended claims.

What is claimed is:

1. A valve actuation system comprising:

a valve stem position indicator arranged to sense a valve stem position in a working fluid valve;

a coupling configured to relay information sensed in said valve stem position indicator;

a high pressure circuit for circulating hydraulic fluid, said high pressure circuit comprising:

a reservoir configured to contain hydraulic fluid;

a pump possessive of a duty cycle, said pump comprising:

an intake in fluid communication with said reservoir; and a discharge;

an accumulator configured to be in pressurized fluid communication with said discharge;

a hydraulic actuator configured to engage with said working fluid valve, said hydraulic actuator in fluid communication with said discharge and said accumulator such that it is mechanically responsive to changes in pressure caused by circulation of said hydraulic fluid;

a servo valve configured to control movement of said hydraulic fluid between said pump, said accumulator and said hydraulic actuator, said servo valve comprising:

a pneumatic fluid path; and a hydraulic fluid path in fluid communication with said pump, said accumulator and said hydraulic actuator;

a trip manifold configured to facilitate retraction of said hydraulic actuator upon attainment of a preset condition;

a low pressure circuit for circulating pneumatic fluid, said low pressure circuit comprising:

a pneumatic fluid supply;

a pneumatic positioner operably responsive to said valve stem position indicator through said coupling, said pneumatic positioner in fluid communication with said pneumatic fluid supply; and a solenoid operated valve in fluid communication with said pneumatic fluid supply and said trip manifold, said solenoid operated valve configured to selectively permit said pneumatic fluid from said pneumatic fluid supply to flow to said trip manifold; and a saturated fluid feedback circuit comprising:

a shutdown manifold in fluid communication with said pneumatic positioner and said servo valve; and a binary valve in fluid communication with said trip manifold, said servo valve and said shutdown manifold, said binary valve configured to intermittently cut off flow of said hydraulic fluid to said servo valve.

2. A valve actuation system according to claim 1, wherein said high pressure circuit and said low pressure circuit are configured to cooperate with one another such that changes in a pneumatic fluid flow through said pneumatic fluid path of said servo valve due to changes in control signal from said pneumatic positioner produce a continuously and proportionally responsive change in hydraulic fluid flow through said hydraulic fluid path of said servo valve, said change in hydraulic fluid flow in turn converted to mechanical actuation in said hydraulic actuator.

3. A valve actuation system according to claim 1, wherein said trip manifold is in fluid communication with said accumulator, said hydraulic actuator, said shutdown manifold and said solenoid operated valve.

4. A valve actuation system according to claim 3, wherein said trip manifold is further in fluid communication with said reservoir and said binary valve.

5. A valve actuation system according to claim 3, wherein said trip manifold further comprises a plurality of interconnected valves arranged in mutually exclusive alternate configurations comprising:

a first configuration wherein said interconnected valve arrangement is such that normal servo valve operation is enabled; and a second configuration wherein said interconnected valve arrangement is such that said trip manifold disables said servo valve.

6. A valve actuation system according to claim 1, wherein said intermittent cut off of flow of said hydraulic fluid to said servo valve coincides with a quiescent operating condition in said pneumatic fluid path of said servo valve.

7. A valve actuation system according to claim 1, wherein said system is further configured to effect a locked hydraulic actuator position upon attainment of said present condition, thereby preventing subsequent working fluid valve manipulation.

8. A valve actuation system according to claim 7, wherein said trip manifold is configured to effect said locked hydraulic actuator position.

9. A valve actuation system according to claim 1, wherein said shutdown manifold further comprises a plurality of valves linked together through pneumatic lines.

10. A fluid handling system, comprising:

a network of piping configured to transport a fluid;

a working fluid valve disposed in said network to regulate the flow of said fluid through at least a portion of said piping;

a valve stem position indicator arranged to sense a valve stem position in a working fluid valve;

a coupling configured to relay information sensed in said valve stem position indicator;

a high pressure circuit for circulating hydraulic fluid, said high pressure circuit comprising:

a reservoir configured to contain hydraulic fluid;

a pump possessive of a duty cycle, said pump comprising:

an intake in fluid communication with said reservoir; and a discharge;

an accumulator configured to be in pressurized fluid communication with said discharge;

a hydraulic actuator configured to engage with said working fluid valve, said hydraulic actuator in fluid communication with said discharge and said accumulator such that it is mechanically responsive to changes in pressure caused by circulation of said hydraulic fluid;

a servo valve configured to control movement of said hydraulic fluid between said pump, said accumulator and said hydraulic actuator, said servo valve comprising:

a pneumatic fluid path; and a hydraulic fluid path in fluid communication with said pump, said accumulator and said hydraulic actuator;

a trip manifold configured to facilitate retraction of said hydraulic actuator upon attainment of a preset condition;

a low pressure circuit for circulating pneumatic fluid, said low pressure circuit comprising:

a pneumatic fluid supply;

a pneumatic positioner operably responsive to said valve stem position indicator through said coupling, said pneumatic positioner in fluid communication with said pneumatic fluid supply; and a solenoid operated valve in fluid communication with said pneumatic fluid supply and said trip manifold, said solenoid operated valve configured to selectively permit said pneumatic fluid from said pneumatic fluid supply to flow to said trip manifold; and a saturated fluid feedback circuit comprising:

a shutdown manifold in fluid communication with said pneumatic positioner and said servo valve; and a binary valve in fluid communication with said trip manifold, said servo valve and said shutdown manifold, said binary valve configured to intermittently cut off flow of said hydraulic fluid to said servo valve.

11. A fluid handling system according to claim 10, wherein said high pressure circuit and said low pressure circuit are configured to cooperate with one another such that changes in said pneumatic fluid flow through said pneumatic fluid path of said servo valve due to changes in a control signal from said pneumatic positioner produce a continuously and proportionally responsive change in hydraulic fluid flow through said hydraulic fluid path of said servo valve, said change in hydraulic fluid flow in turn converted to mechanical actuation in said hydraulic actuator.

12. A method for actuating a working fluid valve, comprising:

arranging a working fluid valve to be disposed within a fluid handling system;

equipping said working fluid valve with an actuator;

coupling a valve stem to said actuator;

arranging a valve actuation system to use both hydraulic and pneumatic fluids to control a working fluid flowing through said working fluid valve, said valve actuation system comprising:

a hydraulic fluid circuit comprising:

a reservoir;

at least one pump possessive of a duty cycle, said pump in suction fluid communication with said reservoir;

an accumulator in pressurized fluid communication with said pump;

a servo valve with a hydraulic fluid flow path disposed therethrough; and a trip manifold configured to facilitate retraction of said actuator upon attainment of a preset condition;

a pneumatic fluid circuit comprising:

a pneumatic fluid supply;

a pneumatic fluid flow path disposed in said servo valve, said pneumatic fluid flow path in controlwise communication with said hydraulic fluid flow path;

a pneumatic positioner responsive to a valve stem position indicator signal, said pneumatic positioner in fluid communication with said pneumatic fluid supply and said pneumatic fluid path of said servo valve; and a solenoid operated valve in signal communication with said pneumatic fluid supply, said solenoid operated valve in fluid communication with said trip manifold and configured to selectively permit said pneumatic fluid from said pneumatic fluid supply to flow therebetween;

sensing a valve stem position with a valve stem position indicator;

relaying information corresponding to said sensed valve stem position to said pneumatic positioner;

generating a difference signal by comparing said information corresponding to said sensed valve stem position to a command signal;

sending said difference signal to said servo valve to vary the flow of pneumatic fluid through said pneumatic fluid flow path in proportion to the magnitude of said difference signal;

adjusting a flow of hydraulic fluid through said hydraulic fluid flow path in proportion to flow changes through said pneumatic fluid flow path;

moving said actuator in response to changes in pressure caused by flow of said hydraulic fluid flowing through said hydraulic fluid flow path;

positioning said trip manifold to facilitate retraction of said actuator upon attainment of a preset condition; and operating a saturated fluid feedback circuit to intermittently stop said pump, thereby effecting a reduction in said duty cycle.

13. A method according to claim 12, comprising the additional step of operating said trip manifold in a plurality of mutually exclusive alternate configurations comprising:

a first configuration wherein said interconnected valve arrangement is such that normal servo valve operation is enabled; and a second configuration wherein said interconnected valve arrangement is such that said trip manifold disables said servo valve.

14. A method according to claim 13, wherein said trip manifold further comprises a plurality of interconnected valves arranged to produce said plurality of mutually exclusive alternate configurations.

15. A method according to claim 12, wherein said intermittent cut off of flow of said hydraulic fluid to said servo valve coincides with a quiescent operating condition in said pneumatic fluid path of said servo valve.

16. A method according to claim 12, wherein said system is further configured to effect a locked hydraulic actuator position upon attainment of said present condition, thereby preventing subsequent working fluid valve manipulation.

17. A method according to claim 16, wherein said trip manifold is configured to effect said locked hydraulic actuator position.

18. A method according to claim 12, wherein said shutdown manifold further comprises a plurality of valves linked together through pneumatic lines.

19. A method according to claim 12, wherein said actuator is a hydraulic actuator.

* * * * *

UNITED STATES PATENT AND TRADEMARK OFFICE

CERTIFICATE OF CORRECTION

PATENT NO. : 6,416,033 B1
DATED : July 9, 2002
INVENTOR(S) : McKell et al.

It is certified that error appears in the above-identified patent and that said Letters Patent is hereby corrected as shown below:

Column 6,
Line 13, reads "SOD open" should read -- 50D open --

Column 8,
Line 36, reads "changes in control signal" should read -- changes in a control signal --

Signed and Sealed this

Seventeenth Day of December, 2002

JAMES E. ROGAN
*Director of the United States Patent and Trademark Office*